United States Patent
Li et al.

(10) Patent No.: US 10,095,855 B2
(45) Date of Patent: Oct. 9, 2018

(54) COMPUTER SYSTEM AND OPERATING METHOD THEREFOR

(71) Applicant: VIA Alliance Semiconductor Co., Ltd., Shanghai (CN)

(72) Inventors: Kai Li, Beijing (CN); Yun Shen, Beijing (CN)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 107 days.

(21) Appl. No.: 15/142,237

(22) Filed: Apr. 29, 2016

(65) Prior Publication Data

US 2017/0161483 A1 Jun. 8, 2017

(30) Foreign Application Priority Data

Dec. 4, 2015 (CN) .......................... 2015 1 0885117

(51) Int. Cl.
- *G06F 9/4401* (2018.01)
- *G06F 21/57* (2013.01)
- *G06F 21/64* (2013.01)
- *G06F 21/73* (2013.01)

(Continued)

(52) U.S. Cl.
CPC ............ *G06F 21/33* (2013.01); *G06F 9/4401* (2013.01); *G06F 21/572* (2013.01); *G06F 21/577* (2013.01); *H04L 9/30* (2013.01); *G06F 2221/034* (2013.01)

(58) Field of Classification Search
CPC ...... G06F 9/4401; G06F 21/57; G06F 21/572; G06F 21/575; G06F 21/577; G06F 21/64; G06F 21/73; G06F 21/74
See application file for complete search history.

(56) References Cited

U.S. PATENT DOCUMENTS

| | | | |
|---|---|---|---|
| 2012/0072734 A1* | 3/2012 | Wishman ............... | G06F 21/572 713/189 |
| 2012/0124356 A1* | 5/2012 | Datta .................... | G06F 21/575 713/2 |

(Continued)

FOREIGN PATENT DOCUMENTS

| | | |
|---|---|---|
| JP | 2004-259077 A | 9/2004 |
| JP | 2015-102889 A | 6/2015 |

(Continued)

OTHER PUBLICATIONS

Intel, "Intel Trusted Execution Technology Enabling Guide", Mar. 2014, Verison 1, pp. 1-32.*

(Continued)

*Primary Examiner* — Nelson Giddins
(74) *Attorney, Agent, or Firm* — McClure, Qualey & Rodack, LLP

(57) ABSTRACT

Code upgrades for computer components. After being powered on, a central processing unit (CPU) of a computer system loads a start-up authenticated code module (start-up ACM) to an authenticated code execution area (ACEA) within the CPU to be authenticated. When the start-up ACM passes authentication, the CPU executes the start-up ACM to connect to a server and receive a code upgrade file for a computer component of the computer system from the server.

21 Claims, 2 Drawing Sheets

(51) Int. Cl.
*G06F 21/33* (2013.01)
*H04L 9/30* (2006.01)

(56) References Cited

U.S. PATENT DOCUMENTS

| | | | |
|---|---|---|---|
| 2012/0265998 A1* | 10/2012 | Kumar | G06F 21/575 |
| | | | 713/187 |
| 2013/0191624 A1* | 7/2013 | Jarmay | G11O 5/14 |
| | | | 713/2 |
| 2014/0026124 A1 | 1/2014 | Gilbert et al. | |
| 2014/0109076 A1* | 4/2014 | Boone | G06F 8/65 |
| | | | 717/170 |
| 2015/0127930 A1* | 5/2015 | Offenberg | G06F 21/572 |
| | | | 713/2 |
| 2015/0143098 A1* | 5/2015 | Arnold | G06F 8/654 |
| | | | 713/2 |
| 2016/0267273 A1* | 9/2016 | Sugawara | G06F 21/572 |
| 2017/0010884 A1* | 1/2017 | Liu | G06F 8/67 |

FOREIGN PATENT DOCUMENTS

| | | |
|---|---|---|
| KR | 2013-0114672 A | 10/2013 |
| WO | WO 2013/089739 A1 | 6/2016 |

OTHER PUBLICATIONS

Intel, "Intel Trusted Execution Technology Lab Handout", Sep. 2010, Intel Developer Forum, p. 1-37.*

European Search Report dated Apr. 6, 2017, issued in application No. 16200717.3-1870.

* cited by examiner

COMPUTER SYSTEM AND OPERATING METHOD THEREFOR

CROSS REFERENCE TO RELATED APPLICATIONS

This Application claims priority of China Patent Application No. 201510885117.7, filed on Dec. 4, 2015, the entirety of which is incorporated by reference herein.

BACKGROUND OF THE INVENTION

Field of the Invention

The prevent invention relates to code upgrades of computer components.

Description of the Related Art

For the computer components of a computer system, there are requirements for code upgrades. For example, microcode patches for a central processing unit (CPU), controller firmware upgrades for a chipset, basic input and output system (BIOS) upgrades, and so on, may be required.

How to safely upgrade the codes of the computer components of a computer system to resist malicious attacks is an important topic in this field.

BRIEF SUMMARY OF THE INVENTION

A computer system in accordance with an exemplary embodiment of the disclosure has a central processing unit and a non-volatile memory. The central processing unit operates in accordance with microcode and includes an authenticated code execution area (ACEA). The non-volatile memory stores a start-up authenticated code module (start-up ACM). After being powered on, the central processing unit executes the microcode to load the start-up authenticated code module from the non-volatile memory to the authenticated code execution area to authenticate the start-up authenticated code module. When the start-up authenticated code module passes authentication, the central processing unit executes the start-up authenticated code module to connect to a server and receive a code upgrade file for a computer component of the computer system from the server.

An operating method for a computer system includes the following steps: allocating an authenticated code execution area within a central processing unit of a computer system, wherein the central processing unit operates in accordance with microcode; using a non-volatile memory to store a start-up authenticated code module; executing the microcode to load the start-up authenticated code module from the non-volatile memory to the authenticated code execution area to authenticate the start-up authenticated code module; and executing the start-up authenticated code module that passes authentication to connect to a server and receive a code upgrade file for a computer component of the computer system from the server.

Because the authenticated code execution area within the central processing unit is prohibited from being accessed by devices other than the central processing unit, the security of the execution of the start-up authenticated code module is guaranteed. In comparison with conventional techniques which get the code upgrade file via the basic input and output system (BIOS) or the operating system (OS) at the risk of malicious attacks, the security of the code upgrading of the computer components in accordance with exemplary embodiments of the disclosure is considerably improved.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows exemplary embodiments carrying out the invention. This description is made for the purpose of illustrating the general principles of the invention and should not be taken in a limiting sense. The scope of the invention is best determined by reference to the appended claims.

Figure 1:
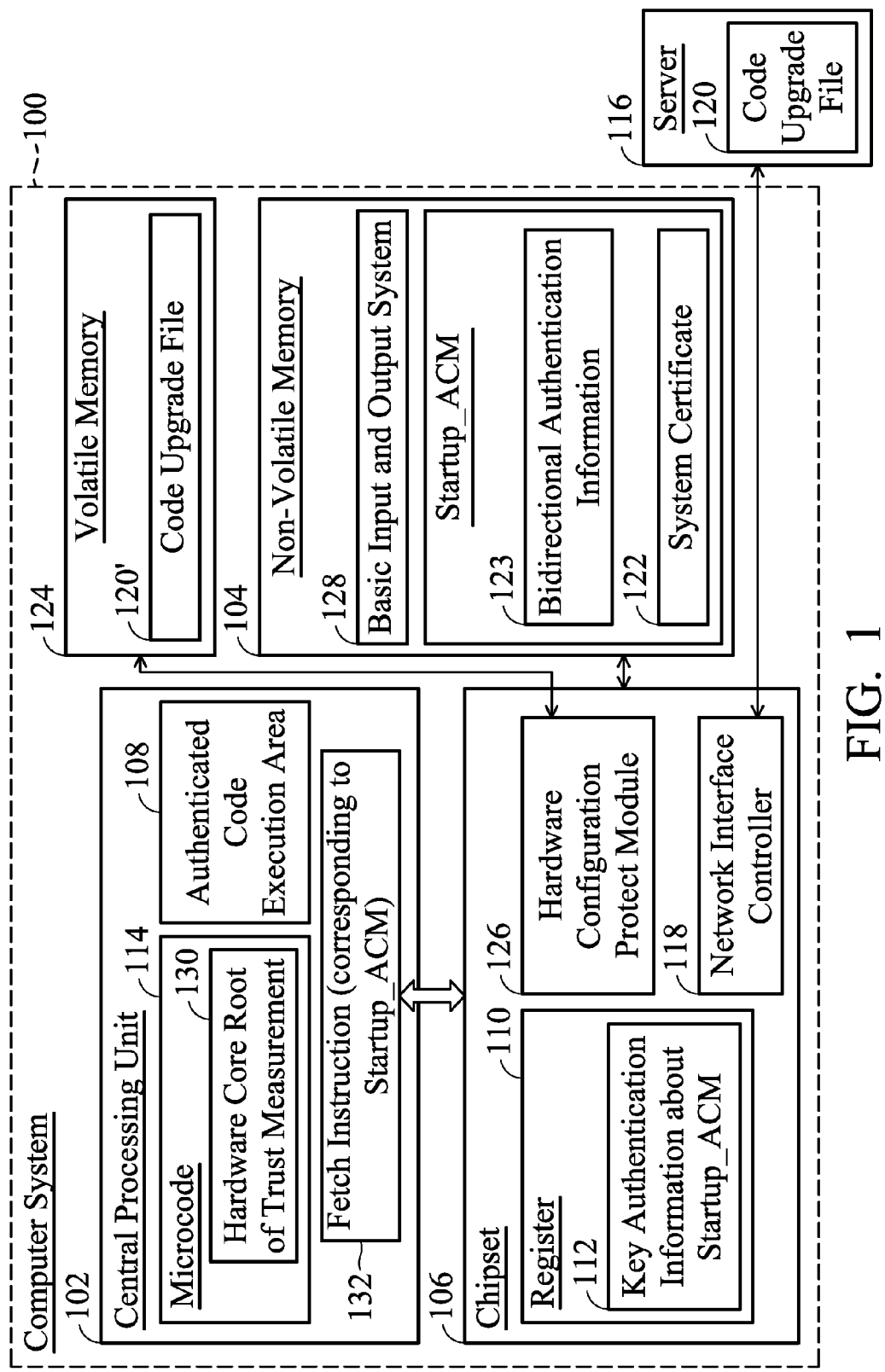
FIG. 1 depicts a computer system 100 in accordance with an exemplary embodiment of the disclosure.

FIG. 1 depicts a computer system 100 in accordance with an exemplary embodiment of the disclosure. The computer system 100 has a central processing unit 102 and a non-volatile memory 104. The central processing unit 102 operates in accordance with microcode 114 and is allocated to provide an authenticated code execution area (abbreviated to ACEA) 108. The non-volatile memory 104 stores a start-up authenticated code module Startup_ACM. After being powered on, the central processing unit 102 executes the microcode 114 to load the start-up authenticated code module Startup_ACM from the non-volatile memory 104 to the ACEA 108 to authenticate the Startup_ACM. When the start-up authenticated code module Startup_ACM passes authentication, the central processing unit 102 executes the start-up authenticated code module Startup_ACM to connect to a server 116 (e.g. via an network interface controller 118). The server 116 provides a computer component of the computer system 100 with a code upgrade file 120, such as a microcode patch for the microcode 114 of the central processing unit 102, an upgrade file for the firmware of the chipset 106, or an upgrade file for the basic input and output system (BIOS). The code upgrade file 120 from the server 116 may be loaded to a volatile memory 124 as 120'.

In the exemplary embodiment, the computer system 100 comprises the chipset 106, and the chipset 106 includes a register 110 which stores key authentication information 112 for the start-up authenticated code module Startup_ACM. In an exemplary embodiment wherein the central processing unit 102 performs an asymmetric encryption algorithm to authenticate the start-up authenticated code module Startup_ACM, the key authentication information 112 may be the hash values of public keys for data encryption and decryption. In this example, the start-up authenticated code module Startup_ACM loaded from the non-volatile memory 104 has a cryptographic signature which includes the information about the public keys for data encryption and decryption. When executing the microcode 114 to authenticate the start-up authenticated code module Startup_ACM, the central processing unit 102 retrieves the public keys from the cryptographic signature of the loaded start-up authenticated code module Startup_ACM and then calculates the hash values based on the retrieved public keys to be compared with the hash values pre-stored as the key authentication information 112 in the register 110. When the calculated hash values match the pre-stored hash values, the start-up authenticated code module Startup_ACM passes the authentication and the procedure proceeds to connecting to the server 116 to get the code upgrade file 120.

In the disclosure, in addition to authenticating the start-up authenticated code module Startup_ACM according to the aforementioned authentication process to ensure the security of the authenticated start-up authenticated code module Startup_ACM, the central processing unit 102 executes the authenticated start-up authenticated code module Startup_ACM in the ACEA 108. The ACEA 108 is prohibited from being accessed by devices other than the central processing unit 102 and thereby the security of executing the authenticated start-up authenticated code module Startup_ACM is further ensured. In comparison with conventional techniques which receive the code upgrade file 120 via the basic input and output system 128 or the operating system (OS) at the risk of malicious attacks, the security of the code upgrading of the computer components in accordance with exemplary embodiments of the disclosure is considerably improved.

In an exemplary embodiment, in addition to ensure the security of the start-up authenticated code module Startup_ACM and the execution environment, the central processing unit 102 further executes the start-up authenticated code module Startup_ACM to connect to the server 116 in bidirectional authentication. In this manner, the reliability of the code upgrade file 120 provided from the server 116 is further improved. In an exemplary embodiment, the start-up authenticated code module Startup_ACM further stores bidirectional authentication information 123 required in the bidirectional authentication between the start-up authenticated code module Startup_ACM and the server 116. When executing the start-up authenticated code module Startup_ACM to connect to the server 116, the central processing unit 102 further provides the server 116 with the bidirectional authentication information 123 to perform the bidirectional authentication between the start-up authenticated code module Startup_ACM and the server 116. In an exemplary embodiment, the start-up authenticated code module Startup_ACM executed in the ACEA 108 communicates with the server 116 via the network interface controller 118.

In an exemplary embodiment, the start-up authenticated code module Startup_ACM further stores a system certificate 122. When safely executing the start-up authenticated code module Startup_ACM in the ACEA 108 and connecting to the server 116, the central processing unit 102 further provides the server 116 with the system certificate 122 and thereby the server 116 provides the code upgrade file 120 based on the system certificate 122 to match the computer component of the computer system 100. The system certificate 122 may show the type, the serial number, and so on of the computer component.

The volatile memory (e.g. a DRAM) 124 temporarily stores the code upgrade file 120' received from the server 116. As shown, the chipset 106 further has a hardware configuration protect module 126, which protects the code upgrade file 120' temporarily stored in the volatile memory 124 to be accessed and retrieved only by the central processing unit 102. The central processing unit 102 retrieves the code upgrade file 120' from the volatile memory 124 and authenticates the retrieved code upgrade file 120', and then uses the authenticated code upgraded file to upgrade the code of the corresponding computer component. In an exemplary embodiment wherein the computer component to be upgraded is the central processing unit 102 and the code upgrade file 120' is the upgrade file of microcode 114, the central processing unit 102 retrieves the code upgrade file 120' from the volatile memory 124 and authenticates the retrieved code upgrade file 120' within the central processing unit 102, and then uses the authenticated code upgrade file 120' to upgrade microcode 114. In another exemplary embodiment, key information for authentication of the code upgrade file 120' is stored in the register 110 and the authentication of the code upgrade file 120' may also be performed within the ACEA 108 that is protected from malicious attacks.

As shown, the start-up authenticated code module Startup_ACM is stored in the non-volatile memory 104 as well as the basic input and output system code (BIOS code) 128. Before BIOS phases 1 to 3 in which the central processing unit 102 authenticates the BIOS by the start-up authenticated code module Startup_ACM, the central processing unit 102 executes the start-up authenticated code module Startup_ACM within an internal security environment (e.g. the ACEA 108) of the central processing unit 102 and connects to the server 116 to receive the code upgrade file 120. During the start-up procedure of the computer system 100, the code upgrade file 120 is obtained by executing the start-up authenticated code module Startup_ACM prior to authenticating and loading the BIOS code 128. In comparison with conventional techniques which obtain the code upgrade file 120 during the upgrade of the BIOS or even after the operating system (OS) starts, the code upgrade file 120 is obtained more timely according to the disclosure.

In an exemplary embodiment, the central processing unit 102 executes hardware core root of trust measurement (H-CRTM) 130 to execute a fetch instruction 132 (e.g. a GETSEC leaf instruction) of the start-up authenticated code module Startup_ACM to load the start-up authenticated code module Startup_ACM from the non-volatile memory 104 to the ACEA 108 and execute the loaded start-up authenticated code module Startup_ACM.

In this paragraph, the microcode 114 of the central processing unit 102 is discussed in detail. The microcode 114 is hardwired firmware within the central processing unit 102, for execution of micro-operations and thereby working as assembly instructions and acting internal functions of the central processing unit 102. The H-CRTM 130 is the microcode which is executed after the central processing unit 102 being powered on and before the authentication of the BIOS (i.e. the BIOS phases 1 to 3).

In this paragraph, the start-up authenticated code module Startup_ACM is discussed in detail, which is one kind of authenticated code module (ACM). ACMs are executed by the central processing unit 102 as extensions of the microcode 114. The ACMs have to pass the authentication of the H-CRTM 130 before being executed within a safety space (e.g. the ACEA 108) allocated within the central processing unit 102. Because the ACEA 108 is provided within the central processing unit 102, the ACM executed within the ACEA 108 is protected from the low-security DMA (direct memory accessing) and code and data leakage of the ACM is also prevented. The key authentication information 112 stored in the register 110 is provided to check whether the start-up authenticated code module Startup_ACM loaded within the ACEA 108 has the correct key. The start-up authenticated code module Startup_ACM is retrieved when the central processing unit 102 is powered on and executes the microcode 114 (e.g. the H-CRTM 130) to call the corresponding fetch instruction (e.g. the GETSEC leaf instruction) 132. By executing the start-up authenticated code module Startup_ACM, a static root of trust measure (STRM) starts, which includes measuring the BIOS boot block. In the disclosure, a connection to the server 116 is established when the start-up authenticated code module Startup_ACM with a high level of security is executed and, based on the high-security architecture, the code upgrade file 120 corresponding to a computer component of the computer system 100 is received from the server 116. In comparison with the disclosure, a conventional technique which packages the code upgrade file of a computer component of a computer system 100 with the updates of the BIOS or UEFI (Unified Extensible Firmware Interface) is more passive and may suffer the risk of not upgrading the code file of the computer component in real time. As for another conventional technique which upgrades the code file of the computer component in OS, security depends on the OS and is risky. A TXT platform issued by Intel may be used in the disclosure.

Figure 2:
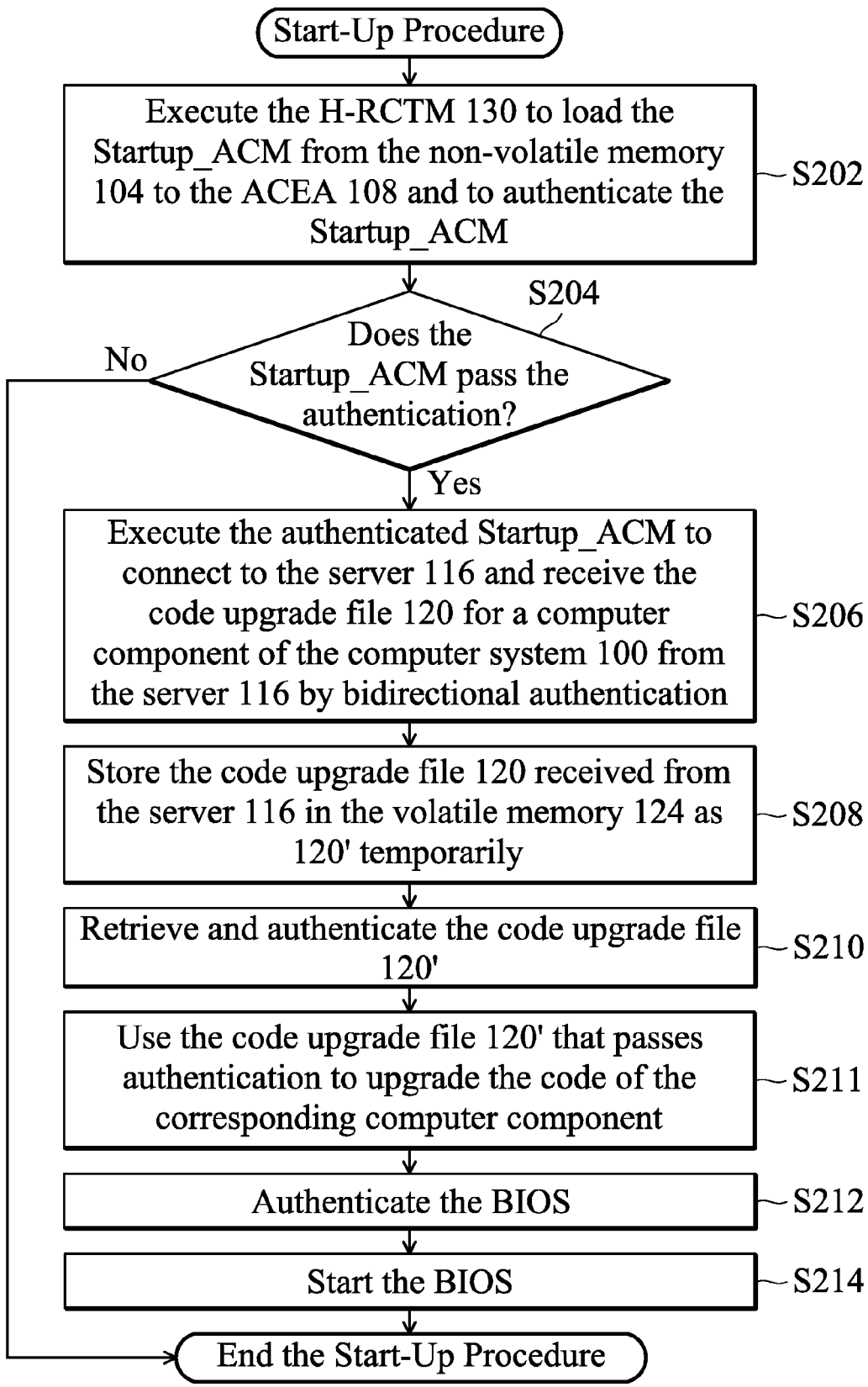
FIG. 2 is a flowchart depicting an operating method for a computer system in accordance with an exemplary embodiment of the disclosure, especially related to a start-up procedure of the computer system.

FIG. 2 is a flowchart depicting an operating method for a computer system in accordance with an exemplary embodiment of the disclosure, especially related to the start-up procedure of the computer system. FIG. 2 is discussed with respect to FIG. 1. In step S202, the microcode 114 is executed. For example, the H-RCTM 130 of the microcode 114 is executed to load the start-up authenticated code module Startup_ACM from the non-volatile memory 104 to the ACEA 108 of the central processing unit 102 and to authenticate the start-up authenticated code module Startup_ACM. The start-up authenticated code module Startup_ACM may be authenticated based on the key authentication information 112. In step S204, it is determined whether the start-up authenticated code module Startup_ACM passes the authentication. When the start-up authenticated code module Startup_ACM passes the authentication, step S206 is performed to execute the authenticated start-up authenticated code module Startup_ACM to connect to the server 116 and, by bidirectional authentication (e.g., based on the system certificate 122 and the bidirectional authentication information 123), the code upgrade file 120 for the computer component of the computer system 100 is received from the server 116. In step S208, the code upgrade file 120 received from the server 116 is temporarily stored in the volatile memory 124 as 120'. In step S210, the code upgrade file 120' in the volatile memory 124 is retrieved and authenticated by the central processing unit 102. As the aforementioned discussion, the volatile memory 124 is controlled by the hardware configuration protect module 126 to be prohibited from being modified by devices other than the central processing unit 102 and the code upgrade file 120' is retrieved and authenticated in such a protected status. When the code upgrade file 120' passes the authentication, step S211 is performed to use the authenticated code upgrade file to upgrade the code of the corresponding computer component (e.g. the microcode 114 of the central processing unit 102). Note that the download of the code upgrade file is conducted prior to step S212. In step S212, the BIOS is authenticated. In step S214, the BIOS starts to operate. When the start-up authenticated code module Startup_ACM does not pass the authentication in step S204, the start-up procedure finishes without performing steps S206 to S214. The start-up authenticated code module Startup_ACM failing to pass the authentication does not connect to the server 116 and does not receive the code upgrade file 120 by step S206 and the BIOS is not authenticated by step S212. Thus, malicious attacks are resisted. In an exemplary embodiment, the system returns an error report to the user.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A computer system, comprising:
a central processing unit, operating in accordance with microcode and including an authenticated code execution area; and
a non-volatile memory, storing a start-up authenticated code module;
wherein:
after being powered on, the central processing unit executes the microcode to load the start-up authenticated code module from the non-volatile memory to the authenticated code execution area to authenticate the start-up authenticated code module; and
when the start-up authenticated code module passes authentication and before authenticating a basic input and output system, the central processing unit executes the start-up authenticated code module to connect to a server and receive a code upgrade file for a computer component of the computer system from the server.

2. The computer system as claimed in claim 1, further comprising:
a chipset, including a register storing key authentication information about the start-up authenticated code module,
wherein the central processing unit authenticates the start-up authenticated code module based on the key authentication information.

3. The computer system as claimed in claim 1, wherein:
the central processing unit executes the start-up authenticated code module to connect to the server with bidirectional authentication.

4. The computer system as claimed in claim 1, wherein:
the start-up authenticated code module further stores a system certificate; and
when the central processing unit connects to the server by executing the start-up authenticated code module that passes the authentication, the central processing unit further provides the server with the system certificate and the server provides the code upgrade file based on the system certificate to match the computer component of the computer system.

5. The computer system as claimed in claim 4, wherein:
the system certificate shows a type or a serial number of the computer component.

6. The computer system as claimed in claim 1, wherein:
the start-up authenticated code module further stores bidirectional authentication information between the start-up authenticated code module and the server.

7. The computer system as claimed in claim 1, further comprising:
a volatile memory, temporarily storing the code upgrade file received from the server.

8. The computer system as claimed in claim 7, further comprising:
a hardware configuration protect module to allow only the central processing unit to access the volatile memory to retrieve the code upgrade file.

9. The computer system as claimed in claim 1, wherein:
the central processing unit authenticates the code upgrade file and uses the authenticated code upgrade file to upgrade a code of the computer component.

10. The computer system as claimed in claim 1, wherein:
after being powered on, the central processing unit executes hardware core root of trust measurement to execute a fetch instruction of the start-up authenticated code module, to load the start-up authenticated code module from the non-volatile memory to the authenticated code execution area and authenticate the start-up authenticated code module within the authenticated code execution area.

11. The computer system as claimed in claim 1, wherein:
the computer component is a central processing unit and the code upgrade file is an upgrade file for the microcode.

12. An operating method for a computer system, comprising:
allocating an authenticated code execution area within a central processing unit of the computer system, wherein the central processing unit operates in accordance with microcode;
using a non-volatile memory to store a start-up authenticated code module;
executing the microcode to load the start-up authenticated code module from the non-volatile memory to the authenticated code execution area to authenticate the start-up authenticated code module; and
before authenticating a basic input and output system, executing the start-up authenticated code module that passes authentication to connect to a server and receive a code upgrade file for a computer component of the computer system from the server.

13. The operating method as claimed in claim 12, further comprising:
using a register of a chipset to store key authentication information about the start-up authenticated code module; and
authenticating the start-up authenticated code module based on the key authentication information.

14. The operating method as claimed in claim 12 wherein a step of executing the start-up authenticated code module that passes the authentication to connect to the server further comprises:
executing the start-up authenticated code module to connect to the server with bidirectional authentication.

15. The operating method as claimed in claim 12, wherein the start-up authenticated code module further stores a system certificate, and a step of executing the start-up authenticated code module that passes the authentication to connect to the server further comprises:
providing the server with the system certificate to make the server provide the code upgrade file based on the system certificate to match the computer component of the computer system.

16. The operating method as claimed in claim 15, wherein:
the system certificate shows a type or a serial number of the computer component.

17. The operating method as claimed in claim 12, wherein:
the start-up authenticated code module further stores bidirectional authentication information between the start-up authenticated code module and the server.

18. The operating method as claimed in claim 12, further comprising:
authenticating the code upgrade file and using the authenticated code upgrade file to upgrade a code of the computer component.

19. The operating method as claimed in claim 18, wherein:
using a register of a chipset to store key information about the code upgrade file; and
authenticating the code upgrade file based on the key information.

20. The operating method as claimed in claim 12, wherein a step of executing the microcode to load the start-up authenticated code module from the non-volatile memory to the authenticated code execution area to be authenticated further comprises:
after being powered on, executing hardware core root of trust measurement to execute a fetch instruction of the start-up authenticated code module to load the start-up authenticated code module from the non-volatile memory to the authenticated code execution area to be authenticated.

21. The operating method as claimed in claim 12, wherein:
the authenticated code execution area is accessed only by the central processing unit to ensure security of the step of executing the start-up authenticated code module that passes authentication to connect to the server.

* * * * *